United States Patent

[11] 3,588,454

[72] Inventor Erich A. Pfeiffer
Los Angeles, Calif. (8730 Orion Ave.,
Sepulveda, Calif. 91343)
[21] Appl. No. 856,094
[22] Filed Sept. 8, 1969
[45] Patented June 28, 1971

[54] PNEUMATIC COMPUTER
10 Claims, 10 Drawing Figs.

[52] U.S. Cl. ........ 235/61.11J, 235/201FS
[51] Int. Cl. ........ G06k 7/02, G06m 1/12
[50] Field of Search ........ 235/200 (R), (PF), 201 (R), (ME), (FS), 61.11 (R), 61.11 (J)

[56] References Cited
UNITED STATES PATENTS

| | | | |
|---|---|---|---|
| 1,541,109 | 6/1925 | Burton | 235/201R |
| 3,057,375 | 10/1962 | Etter | 235/201ME |
| 3,302,004 | 1/1967 | Eckert, Jr. et al. | 235/61.11J |
| 3,461,279 | 8/1969 | Maurer | 235/201R |

*Primary Examiner*—Daryl W. Cook
*Attorney*—Allan M. Shapiro

ABSTRACT: Pneumatic computer having a base in which manually operable slides are movably mounted. A template plate covers the slides and has holes therein related to channels and atmospheric vents in the slides. A program card goes on top of the template plate, and a manifold block has a plurality of input and output manifolds therein, with the input and output manifolds related by interconnecting openings in the program card and template plate, and the channels and atmospheric vents in the slides. Thus, AND and OR gates are formed, with the slides furnishing input alternatives. Signalling means is connected to the output manifold to indicate logic results.

INVENTOR.
ERICH A. PFEIFFER
BY Allan M. Shapiro
ATTORNEY

INVENTOR.
ERICH A. PFEIFFER
BY Allan M. Shapiro
ATTORNEY

INVENTOR.
ERICH A. PFEIFFER
BY Allan M. Shapiro
ATTORNEY

PNEUMATIC COMPUTER

BACKGROUND OF THE INVENTION

1. Field of the Invention

This invention is directed to a pneumatic computer, and particularly to a pneumatic computer of such character that it can be inexpensively constructed so that it can be used in considerable numbers as teaching devices, for toys, or as means illustrating computer fundamentals.

2. Description of the Prior Art

Man's need for computation has caused him to invent computational aids since prior to the general adoption of the decimal system. These computational aids, in recent years, have taught man that a simpler, binary system can be more readily employed by computational aids. This realization, plus the development of inexpensive and small, lower power binary digital devices, has brought upon us the computer age. However, despite the present superiority of electronic binary digital systems for large scale computation and memory, fluid systems have also been developed. Fluid systems also are readily adaptable to binary logic, especially AND logic for on/off valves can represent the binary operation, and series-connected valves can be employed for the AND operation. While pneumatics do not represent a convenient, economical replacement for large scale electronic digital computation, the pneumatic systems can be highly desirable for simpler determination. For example, the prior art shows where pneumatic AND gates check the presence of holes in punched data cards. Furthermore, such sensing systems can detect the presence of corresponding holes in a stacked deck of punched data cards. Output signalling of such devices is conveniently either flow or pressure sensitive.

For the most part, the prior art does not employ OR gates in pneumatic logic circuits and, where they do appear, they are employed in fairly expensive and complicated logic equipment. Furthermore, the prior art does not teach structures which are fully capable of AND or OR operation, within an inexpensive or simple mechanism whereby such structures can be mass produced for individual teaching or toy operation. The prior art does not provide structures wherein a card inserted into the pneumatic computer defines the logic operations to be employed in a specific problem, together with a manually selectable input so that the user of the computer can conveniently control the pneumatic channels so that the output signal is a function both of the logic selected on the card and the input selection by the user.

SUMMARY OF THE INVENTION

In order to aid in the understanding of this invention, it can be stated in essentially summary form that it is directed to a pneumatic computer. The pneumatic computer has manually movable slides having openings therein. The slides move in association with a base, each having pneumatic openings of such nature that AND and OR operations can be accomplished. A program card is positionable with respect to the slides and a manifold block is positionable over the program card to provide a complete logic system. Output is signalled from the manifold block when the selected logic determined by the openings in the program card is satisfied.

Accordingly, it is an object of this invention to provide a pneumatic computer having manually operable slides which are movable in relationship to program cards so that logic operations are accomplished in accordance with various channels and passages in association with the slides and the program card. It is another object to provide an output signalling device on the pneumatic computer which visually signals the satisfaction of the desired logic. It is a further object to provide an inexpensively constructed pneumatic computer which is capable of both AND and OR operations, and in which the operator can make manual selections so that a fully operable computer is available to the mass market. It is a further object to provide an inexpensively constructable pneumatic computer suitable for teaching machine use and, as such, employing manually selectable input means, as well as being capable of AND or OR operations. It is a further object to provide a pneumatic computer of such construction that it can be economically placed upon the toy market so that AND and OR logic is available in a toy construction.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several FIGS.

DESCRIPTION OF THE PREFERRED EMBODIMENTS

Figures 1, 2:
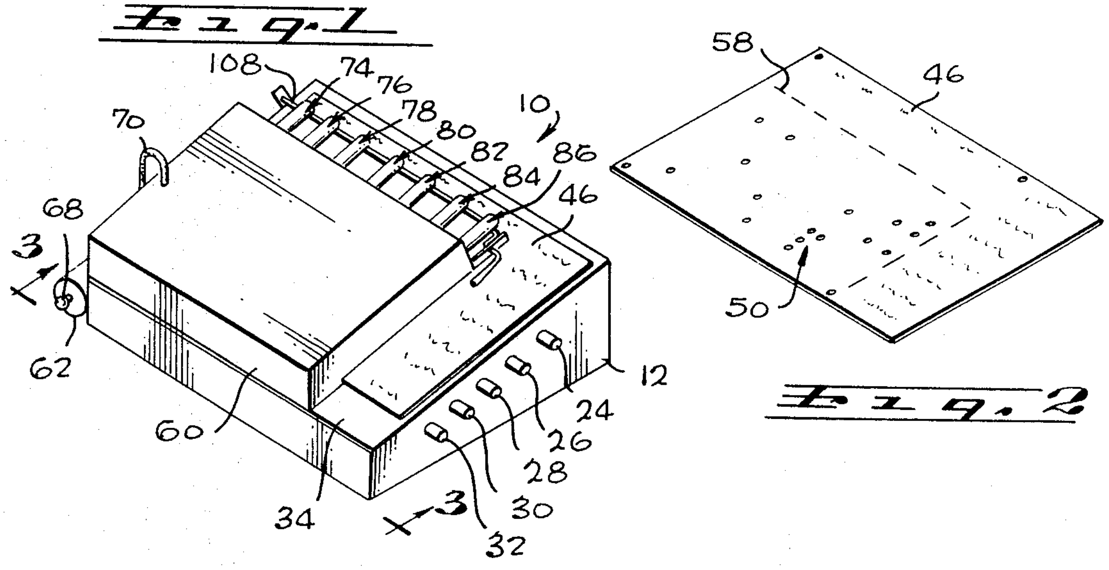
FIG. 1 is an isometric view of a preferred embodiment of the pneumatic computer of this invention.
FIG. 2 is an isometric view of a program card employed with the pneumatic computer of this invention.

Referring to FIG. 1, the pneumatic computer of this invention is generally indicated at 10. Base 12 has a flat bottom so that the computer is adapted to be placed on a desk in front of the user so that it can be employed at convenient height. The upper surface 14 of the base (see FIG. 4), is angularly inclined with respect to the bottom so that it has an appropriate angle, somewhat facing the user. This is for convenience in operation and is also related to gravity sensitive parts of the computer, as is hereinafter described.

Figure 3:
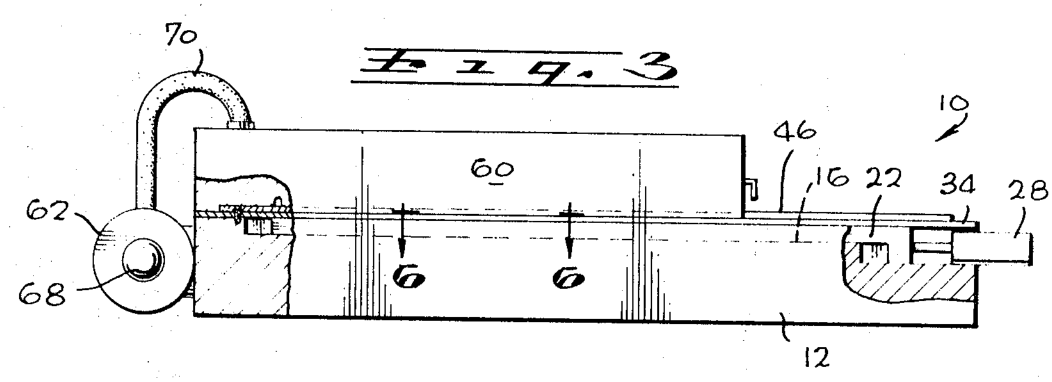
FIG. 3 is a front view of the computer, looking generally along line 3—3 of FIG. 1.

Recess 16 is formed across a portion of the top of base 12 to accommodate a plurality of slides. Several of the slides are indicated at 18, 20 and 22. As is seen in FIG. 3, the slides have manual operating means on their right-hand ends. These manual handles are indicated at 24, 26, 28, 30 and 32. These handles both indicate the position of the slides as well as to permit manual grasp of the handle for slide operation. The slides each have left and right limiting positions. The slides have various channels therein and therethrough so that different interconnections are made at the alternative slide positions. Furthermore, base 12 has appropriate openings therethrough to provide the venting necessary at some slide positions. The tops of the slides are level with the upper surface 14 of base 12.

Figure 7:
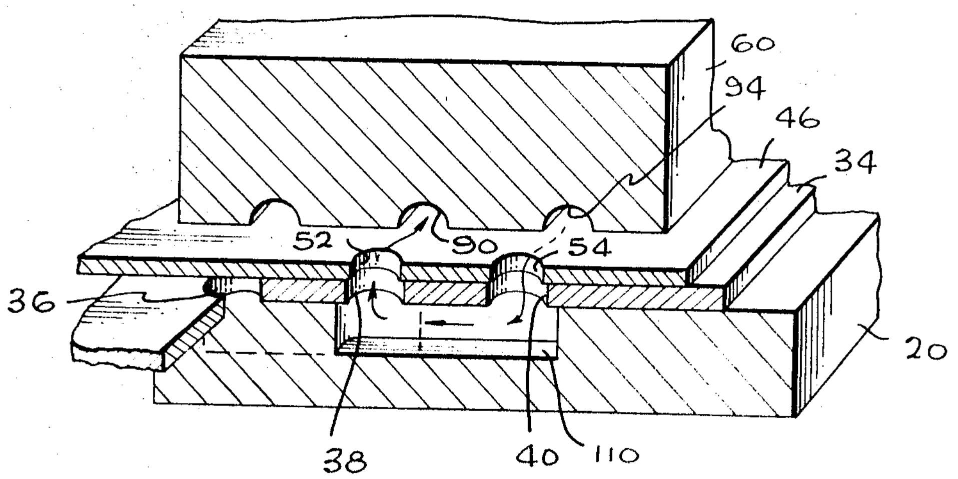
FIG. 7 is an enlarged sectional isometric view showing slide structure suitable for logical OR operation.
Figure 8:
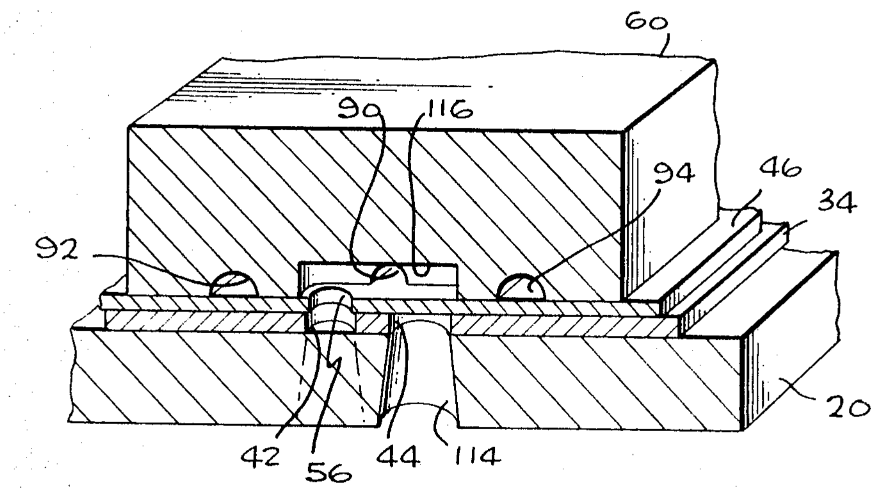
FIG. 8 is an enlarged sectional isometric view showing structure suitable for logical AND operation.

Template plate 34 is secured to the upper surface 14 and overlies the slides recessed in the base. Openings through the template plate correspond to all the possible openings in the program card, to be described later. Template plate openings 36, 38 and 40 are illustrated in FIG. 7, while template plate openings 42 and 44 are illustrated in FIG. 8. The openings through the slides, and the grooves therein, cooperate with the template plate openings so that valving takes place therebetween. Such valve operation supplies the logic considerations and, since the valve operation is accomplished by manual input by the operator, various logic operations can be accomplished by the operator.

Figures 4, 5:
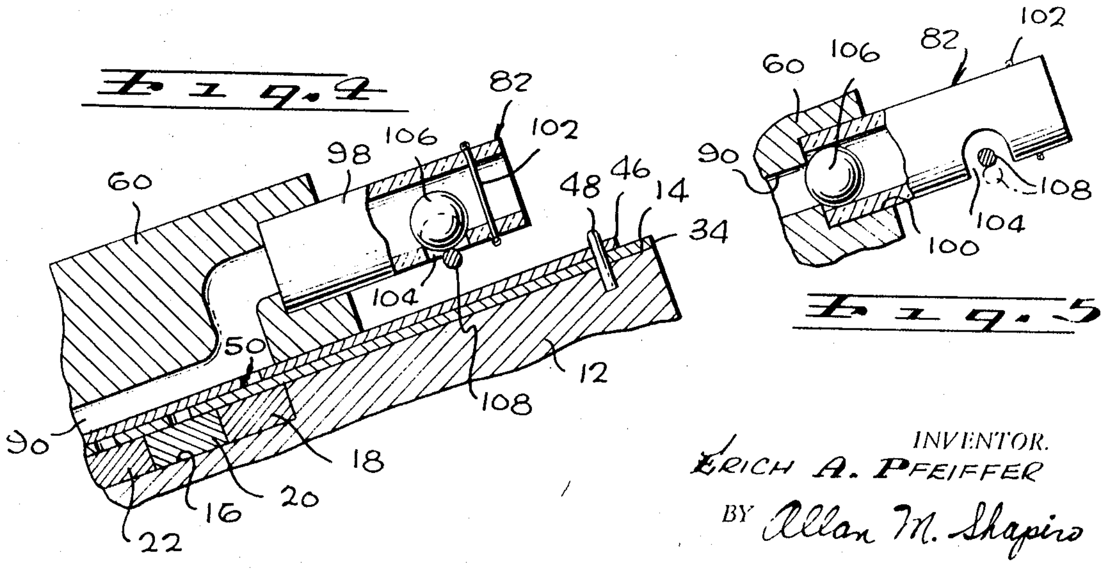
FIG. 4 is an enlarged section through a portion of the computer, and particularly the output signalling means.
FIG. 5 is a fragmentary view of the structure of FIG. 4, showing the output signalling means in the nonindicating position.

Which of the openings in the template is effective for valving depends upon the openings in program card 46, which overlies at least that portion of the template plate 34 which has openings therein. As is seen in FIG. 4, program card 46 is placed over locating pins, one of which is indicated at 48, so that the program card is properly interrelated with the balance of the pneumatic computer system. The program card has a plurality of holes therein, generally indicated at 50, and specific holes are indicated in FIGS. 7 and 8 at 52, 54 and 56. As is seen in FIGS. 1 and 2, the holes 50 are arranged in only a portion of the cards as defined by dotted line 58. The portion of card 46 to the right of the dotted line is adjacent the panels 24—32 and, accordingly, can carry information thereon with respect to the settings of the handles. Furthermore, the upper part of the card above line 58 can carry information relating to the output indicators of the computer, as is hereinafter described. The holes 50 are arranged in a particular pattern to demand a particular setting of handles 24—32 to achieve a particular pattern of the output indicators. Thus, the holes 50 are arranged in accordance with the needs of individual cards, and these holes determine the logic operations which are accomplished by the computer.

Figure 10:
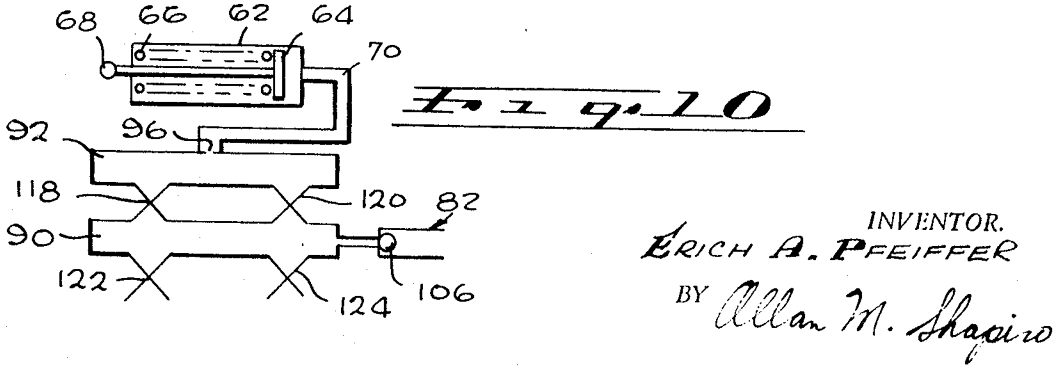
FIG. 10 is a schematic diagram showing the related valve structures which provide AND and OR logic operations.

On top of the program card is positioned manifold block 60. Manifold block 60 is related to base 12 in such a manner that they interfit in only one position so that pneumatic interconnections and relationships are maintained. Air pump 62 has piston 64 therein which is urged to the right by spring 66, as seen in FIG. 10. Handle 68 permits retraction of the piston against the spring, and release of the handle causes an air pressure wave to be discharged from the air pump through flexible hose 70 into manifold block 60. This pressurizes supply channel 72 in the manifold block.

A plurality of output indicators 74 through 86 are mounted on the manifold block. Each of the output indicators has an output channel connected thereto. Channels 88 and 90 are illustrated in connection with output indicators 80 and 82. At least one input channel is associated with each output channel. Input channels 92 and 94 are shown as being positioned adjacent to and parallel to output channel 90. Input channels 92 and 94 are connected together, and are connected through orifice 96 to supply channel 72. Thus, supply channel 72 supplies air through orifice 96 to input channels 92 and 94. A similar arrangement is included for each of the output indicators 74—86. As is seen in FIGS. 4, 6, 7 and 8, both the input channels and output channels are formed as grooves on the bottom of manifold block 60. Furthermore, it can be appreciated that pneumatic management requires that pneumatic flow be constrained substantially to that desired path. Thus, substantial sealing is accomplished by such means as is convenient. One of the more convenient means is producing the slides, template plate, program card and manifold block of resilient material so that, when force means is applied to clamp them together, they resiliently deflect to accomplish adequate sealing. Thus, resilient clamp means for maintaining these structures together may form a part of the preferred embodiment although, since such is conventional, such clamping means is not specifically shown in the drawings.

Output indicator 82 is illustrated in more detail in FIGS. 4 and 5. The remaining output indicators are of identical construction, so only output indicator 82 need be described in detail. It comprises a transparent, cylindrical tube 98 which is set into recess 100 which has a depth slightly greater than the tube inside diameter. Output channel 90 is of smaller diameter than the interior diameter of tube 98 where the two are joined. Transparent tube 98 extends upward, away from manifold block 60, and has cross pin 102 across the open, outer end. Seat 104 is formed as an opening in the lower side of tube 98, adjacent cross pin 102. Ball 106 is captured in tube 98. Ball 106 is of slightly smaller diameter than the interior diameter of the tube so that movement of the ball away from its rest position, shown in FIG. 5, is responsive to air moving out of channel 90 into tube 98. When the ball is thrust up tube 98 as far as seat 104, it drops into seat 104 to be retained there, even in the absence of airflow upward through tube 98. Thus, the upper position of ball 106, as seen in FIG. 4, serves as permanent indication, until reset, of the fact that air has flowed upward in output channel 90. Reset is accomplished by means of bar 108 which is lifted from the full line position of FIG. 4 to the full line position of FIG. 5 to move ball 106 out of its seat 104 and to permit it to gravitationally return to its lowered position of FIG. 5. Ball 106 is preferably brightly colored so that its output indication can readily be determined.

The interrelationship between the holes in the program card and the slides determine and AND or OR gate operation. Referring to FIG. 7, slot 110 is formed in the top of slide 20. Similarly, slot 112 is formed in the top of slide 18. These slots are sufficiently long and are so positioned that, when slides 18 and 20 are in their right-hand position, the slots 112 and 110, respectively, are positioned in communication with holes in template plate 34, which are aligned with channels 90 and 94. Similarly, when the slides are in the left position, slots 112 and 110 overlap holes in template plate 34, which are aligned with slots 90 and 92. The template plate holes are shown at 36, 38 and 40 in FIG. 7. It is clear that, by proper selection of holes in the program card, one of the input channels 92 or 94 can be connected with the output channel 90 when the slide is in the selected position. Thus, holes 52 and 54 in program card 46 (see FIG. 7), permit the communication between channels 94 and output channel 90 when slide 20 is in the right-hand position, through the holes in the template plate and pattern card and through channel 110. When air under pressure is delivered to inlet air channel 72 and the conditions are as described, and there is no other outlet to channel 90, such airflow in the direction of the arrows in FIGS. 6 and 7 causes indicator ball 106 to move its its indicating position. Since slide 18 has an identical slot 112, and the proper positioning and allocation of holes in the program card with respect to either of slots 110 and 112 can cause indicator ball actuation, these slots act as an OR gate. When either of them is properly arranged, actuation occurs. Thus, each pair of slots with respect to the output channel represents OR gate logic.

Figure 6:
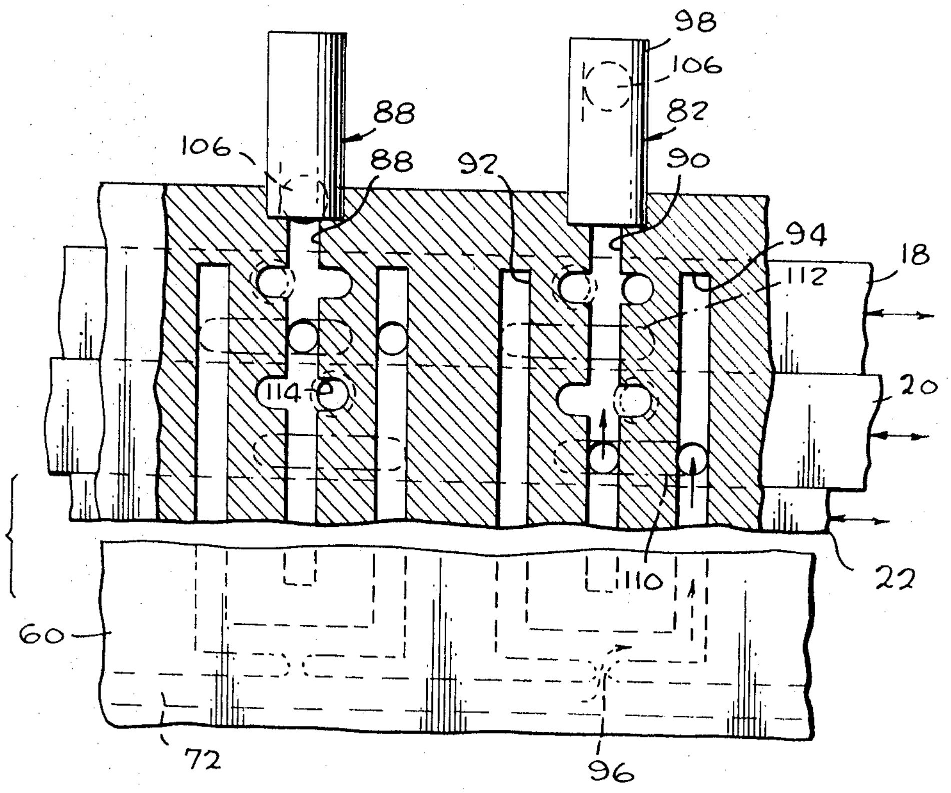
FIG. 6 is an enlarged section taken generally along the line 6—6 of FIG. 3.

As is seen in FIGS. 6 and 8, slide 20 has a vent opening 114 therein. On the bottom side of said opening 114, it is open to the atmosphere through a convenient opening in base 12. Thus, vent opening 114 serves as an atmospheric vent when it is connected to a channel. Template plate openings 42 and 44 correspond to the alternative positions of vent opening 114 as slider 20 is moved from its left terminal to its right terminal position. Program card 46 can have an opening over either of template plate openings 42 and 44, depending upon the desired program action. As illustrated in FIG. 8, the program card has an opening 52 over template plate opening 42. Furthermore, output channel 90 has a cross channel 116 which extends to a sufficient width to be aligned over both of template plate openings 42 and 44. Thus, when vent opening 114 is aligned with an associated program card opening, output channel 90 is vented to atmosphere. When so vented, output channel 90 cannot build up sufficient pressure to actuate indicator ball 106, because of airflow being limited by restricting orifice 96, even when a plurality of OR gate channels are open. Each slide has a vent opening 114 in association with cross channel 116 in each output channel, together with template plate openings, as described, so that this action can take place at any juncture between a slide and an output channel.

The structure of FIG. 7, together with the structure of FIG. 8 on an adjacent slide, thus serves as AND gate logic. When a slot 110 is properly positioned in association with pattern card openings to supply air to an output channel, and when a vent opening 114 is positioned not to vent that output channel, an indication occurs. In this way, AND logic is accomplished. FIG. 10 schematically illustrates this pneumatic logic, where valves 118 and 120 represent the OR gate supply valving to output channel 90, or parallel slides. Similarly, valves 122 and 124 represent the venting to atmosphere so that either of the input valve 118 or 120, together with either of the output valves 122 and 124, act as AND logic.

Figure 9:
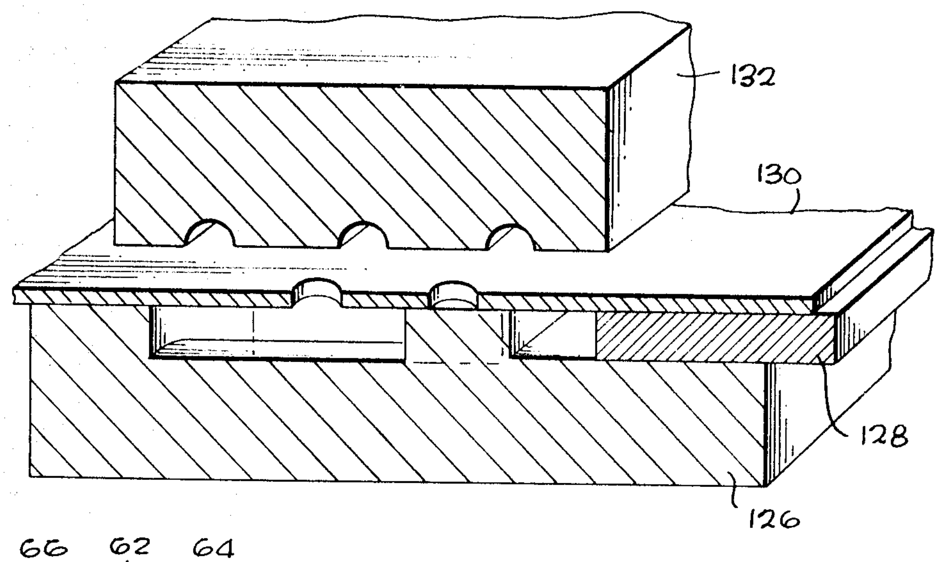
FIG. 9 is an enlarged sectional isometric view showing an alternative embodiment of the structure of the pneumatic computer of this invention.

FIG. 9 is a detail of an alternative embodiment, which detail shows the logic characteristics of FIG. 7. As the description of FIG. 9 proceeds, however, it is clear that this alternative embodiment can also embody channels and ports of such character as to also achieve the logic accomplishments of the structure of FIG. 8. In FIG. 9, slide 126 corresponds to slide 20 but, instead of being held down by a template plate 34, as shown in FIG. 7, slide 126 is held down by guide 128. Slide 126 is one of a group of slides and operates in conjunction with a base, similar to the earlier slides. The slides are recessed into the base so that the tops of the slides are even with the top of the base. Over the slides and the base is positioned program car 130 which now cooperates directly with the slides without the intermediate template plate. Manifold block 132 is substantially sealed to the top of program card 130 in such a manner that the program card can be removed and replaced as desired. Suitable channels in the manifold block, openings in the program card, and slots and vents in the slide, provide for the same logic accomplishments as the preferred embodiment previously described.

In operation, a program card is prepared with the correct openings to accomplish particular logic with the desired setting of the slides. For a simple true-false quiz, the questions are set forth along the right edge of the program card. Only one slide is related to each question. Holes are placed in the program card so that, when the slide is correctly set for each particular question, the corresponding output indicator indicates that the correct answer has been achieved. In this situation, one slide and one output indicator is employed for each question.

More complex quizzes require several input choices. When alternative answers are correct, a slide is employed for each alternative. Holes are located in the program card so that, when one of the alternatives is correctly indicated by slide position, the output indicator is actuated. Such use of OR logic is readily accomplished.

Similarly, AND logical operations have the card marked at the right, adjacent two slides, with the question. Upon setting of the two slides in the correct position, and actuation of the air pump, the AND logical operation is accomplished by appropriate holes in the pattern card. Thus, input information along the right edge of the pattern card indicates to the operator the correct slide positions. Upon air actuation, the output indicates the results of the corresponding logic.

This invention having been described in its preferred embodiment, and an alternative embodiment also described, it is clear that this invention is susceptible to numerous modifications and embodiments within the ability of those skilled in the art and without the exercise of the inventive faculty.

I claim:

1. A pneumatic computer, said pneumatic computer comprising:

a manifold block, said manifold block having at least one outlet channel therein and one inlet channel therein, sensitive means connected to said outlet channel to signal pneumatic flow in said outlet channel, pressurization means connected to said inlet channel to provide pneumatic flow to said input channel; and movable means movably mounted with respect to said channels in said manifold block, at least one connecting means in said movable means to lie adjacent both said inlet channel and said outlet channel, at least one vent opening in said movable means to lie adjacent said outlet channel to vent said outlet channel, said manifold block and said movable means being adapted to have a selectively perforated program card positioned therebetween to selectively permit pneumatic connection between said channels and said movable means so that flow to and venting of said output channel from said input channel is a function both of position of said movable means and perforations in the program card.

2. The pneumatic computer of claim 1 wherein:

said output signalling means comprises an inclined tube having a vented upper end, the lower end of said tube being pneumatically connected to said output channel, a float in said tube, said float floating towards a visible position at the vented upper end of said tube when said output channel is pneumatically supplied, and opening in the lower side of said tube towards the vented upper end thereof, said float resting in said side opening after pneumatic supply to said outlet channel so that said float continues indication after cessation of pneumatic supply.

3. The pneumatic computer of claim 2 wherein:

reset means is positioned adjacent said lower side opening in said output indicator, said reset means being movable into said side opening to move said float out of said side opening and permit said float to descend in said indicator means away from indicating position when said output channel is unpressurized.

4. The pneumatic computer of claim 1 wherein:

said movable means comprises first and second slides, said first and second slides each being movable in said manifold block in a direction generally transverse to said channels, each of said slides containing a groove positionable to intersect both said input channel and said output channel so that said grooves on said first and second slides comprise pneumatic OR gates, in conjunction with slide position and perforations in the program card.

5. The pneumatic computer of claim 1 wherein:

said movable means comprises first and second slides, said slides being movable in a direction generally transverse to said channels in said manifold block, one of said slides having a channel therein movable in conjunction with respect to said inlet channel and said outlet channel so that, in conjunction with perforations in the program card, said inlet channel is pneumatically connected to said outlet channel, the other of said slides having a vent therein, said other slide being movable to a position wherein said vent in conjunction with a perforation in said program card connects said output channel to atmosphere so that said slides in conjunction with the program card can act as an AND gate.

6. The pneumatic computer of claim 5 wherein:

each of said slides contains a groove positionable to intersect both said input channel and said output channel so that said grooves on said first and second slides comprise pneumatic OR gates, in conjunction with slide position and perforations in the program card.

7. The pneumatic computer of claim 6 wherein:

there is an inlet channel in said manifold block on each side of said outlet channel, said slides being movable so that grooves in said slides can interconnect either one of said inlet channels with said outlet channel in conjunction with perforations in the program card.

8. The pneumatic computer of claim 1 wherein:

a supply conduit is positioned in said manifold block, and said manifold block is provided with a plurality of outlet channels, each of said outlet channels having its own indicator means, at least one inlet channel in said manifold block in conjunction with each of said outlet channels, orifice means in said supply conduit, each of said orifice means being connected to an inlet channel so that said inlet channels are independently supplied from said supply conduit.

9. The pneumatic computer of claim 8 wherein:

there are two inlet channels in association with each of said outlet channels, said two inlet channels being connected together and being supplied by the same orifice from said supply conduit, said movable means being movable to interconnect either one of said inlet channels with said outlet channels.

10. The pneumatic computer of claim 9 wherein:

said supply conduit is supplied with pneumatic pressure by a manually actuated pneumatic pump.